United States Patent [19]

Hart

[11] Patent Number: 5,316,665
[45] Date of Patent: May 31, 1994

[54] PRE-FILTER OIL INSPECTION SCREEN

[76] Inventor: Robert M. Hart, R.D. 1, Box 172, East Nassau, N.Y. 12062

[21] Appl. No.: 962,138

[22] Filed: Oct. 16, 1992

[51] Int. Cl.⁵ .............................................. B01D 35/02
[52] U.S. Cl. ...................... 210/85; 210/316; 210/443; 210/445; 210/495; 210/499; 210/DIG. 17
[58] Field of Search ............... 210/85, 311, 316, 445, 210/495, 499, DIG. 17, 440, 443, 444; 140/24

[56] References Cited

U.S. PATENT DOCUMENTS

| | | | |
|---|---|---|---|
| 2,646,884 | 7/1953 | Findley | 210/311 |
| 5,112,476 | 5/1992 | Cote et al. | 210/316 |

FOREIGN PATENT DOCUMENTS

| | | | |
|---|---|---|---|
| 600089 | 6/1960 | Canada | 140/24 |
| 965328 | 7/1964 | United Kingdom | 210/DIG. 17 |

OTHER PUBLICATIONS

Brochure from Allied Signal Inc., Aftermarket Filter Division Copyright 1991, six pages.

*Primary Examiner*—Matthew O. Savage
*Attorney, Agent, or Firm*—Schmeiser, Morelle & Watts

[57] ABSTRACT

The invention is a disk-shaped screen adapted for removable placement onto one end of a standard-type oil filter. When the screen is placed on the oil filter, it is located in an area bounded by the oil filter's mounting gasket and it overlies the filter's inlet ports. The screen is made of a wire mesh having approximately 1600 openings per square inch. The screen functions to collect larger-sized particles from the oil stream before they enter the interior of the oil filter. By collecting these particles in a readily viewable manner, the screen enables a person to easily determine from the types and size of collected particles if any unusual engine wear has occurred or if the engine has suffered internal damage.

6 Claims, 1 Drawing Sheet

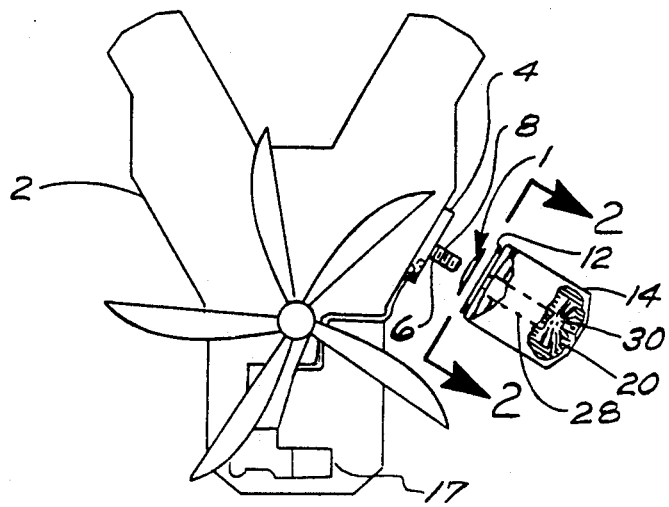
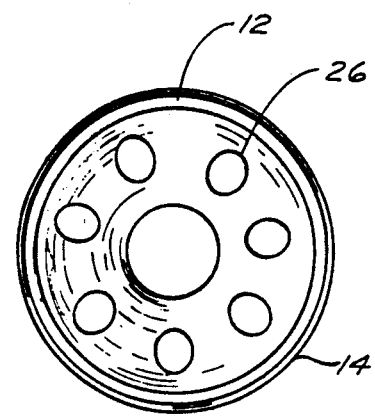
FIG. 1
FIG. 2
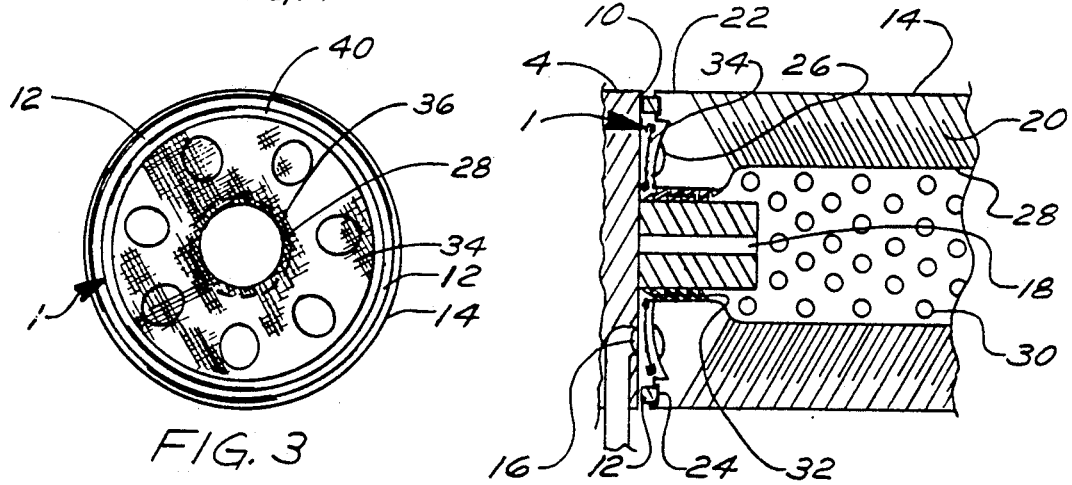
FIG. 3
FIG. 4
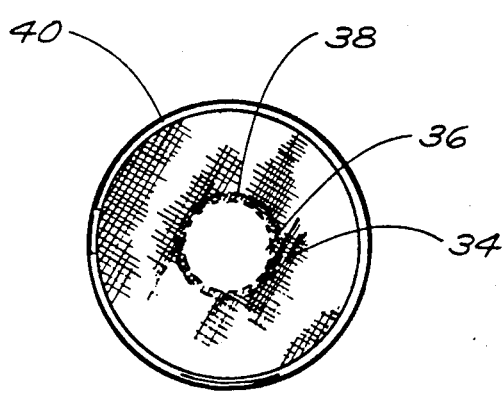
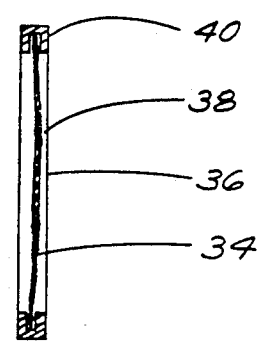
FIG. 5
FIG. 6

PRE-FILTER OIL INSPECTION SCREEN

FIELD OF THE INVENTION

The invention is in the field of filtration devices. More particularly, the invention is a circular screen designed to be used in combination with the cylindrical-type of oil filter commonly used to filter the oil of automobile engines. The screen is adapted for placement over the filter's inlet ports and functions to remove large particles of material from the oil before the oil enters the interior of the oil filter.

BACKGROUND OF THE INVENTION

In automobile engines, the lubricating system normally includes a filter designed to remove particulate impurities from the lubricating oil. The filter is located in the oil flow path just downstream of the oil pump so that any particulate impurities in the oil are trapped in the oil filter before they reach vital engine areas such as the bearing surfaces.

One of the most critical periods when filtration of the oil is required is when breaking in a new or rebuilt engine. During the break-in period, the engine's moving parts are rubbing against each other and wearing down any surface irregularities until the parts mesh smoothly with each other. As this is occurring, minute particles of metal are often worn or broken off from the contacting surfaces and are picked up by the moving oil. In addition, if there are any gaskets and/or seals that are disintegrating due to improper installation or defective materials, particles of these materials will also become caught in the oil stream. As the oil is continually pumped, these particles become trapped in the filter.

After the initial break-in period is completed, the old oil and oil filter are normally removed from the engine and are replaced with new oil and a new oil filter. For most engines, this period occurs after approximately 500 miles of driving. For racing engines, the period is usually much less. At the end of this short period, an engine is considered to be broken in since the rate of engine wear will have greatly decreased.

If one were to cut apart the old oil filter to inspect it at the end of the break-in period, one would be able to view all of the collected particles. By inspecting the type and quantity of particles, one could ascertain how much wear had taken place and possibly the location(s) where the wear had taken place. If an unusually large amount of metal or gasket/seal particles are present, this indicates that an engine component either is misaligned, defective or was improperly installed. Even if the engine seems to be operating correctly, the presence of a great number of particles in the filter indicates that a premature engine failure might be imminent.

For the average vehicle, an inspection of the oil filter's interior is not performed after the break-in period. This is due to the large amount of time and effort required to cut open an oil filter. Since the rate of premature engine failures is fairly low, the added time and expense are not considered warranted. In addition, since the inspection results may be inconclusive or only signal that a part may fail under certain adverse conditions, most engine builders do not want to needlessly alarm their customers.

The above noted disinclination to inspect the oil filter is not shared by racing car mechanics or others who are concerned with the reliability and long-term durability of the vehicle's engine. For a mechanic in charge of a racing car, knowledge of how the engine's parts have broken in is critical. For this reason, the engine's oil filter is checked frequently during and after the racing engine's break-in period. However, for the average person, it is impractical and extremely difficult to check the interior of a typical oil filter.

SUMMARY OF THE INVENTION

The invention is a screen designed to be removably inserted into a vehicle's lubrication system just upstream of the oil filter. The screen is adapted for placement at the front of an oil filter in a location where it overlies the filter's inlet ports.

The screen is in the form of a circular piece of wire mesh having a large diameter aperture at its center. Additional metal reinforcement is located in the area about the screen's center aperture and also about its outer perimeter. The screen is sized so that it can be placed on the front of an oil filter within the circle formed by the filter's circular mounting gasket. When the oil filter is placed onto the engine's oil filter mounting base, the base's center nipple extends through the screen's center aperture and is threadably engaged to the interior of the oil filter.

The screen is made of a fine stainless steel wire mesh having a grid of approximately 40×40 squares per inch (i.e.—each hole in the grid has a length of approximately one-fortieth of an inch and a height of approximately one-fortieth of an inch). The wires that make up the grid have a diameter of approximately 0.010 inches. The reinforced area about the screen's outer perimeter makes use of 24 gauge (0.027 inch) stainless steel sheet metal wrapped about the immediately adjacent wire mesh. The reinforcement about the screen's center aperture is in the form of a quantity of solder melted into the screen in the area immediately adjacent the center aperture.

When an engine has the screen installed, the screen acts as a pre-filter and collects the large-sized particles from the oil stream before they enter the oil filter's inlet ports. The very small particles are allowed to pass through the screen and be filtered out of the oil by the oil filter. In this manner, the large particles that are of the most concern are trapped on the screen before they disappear into the interior of the oil filter.

Since the screen can be manufactured in different sizes to fit most standard size oil filters, a screen in accordance with the invention can be used by the novice or by a professional mechanic on most common engines. The screen is readily accessible and can be installed without the use of special adaptors. Since the screen is reusable, it can be placed on the new oil filter every time an oil and filter change is made. It not only allows a person to inspect the type and size of the trapped particles after the break-in period, but its continued use allows a person to monitor the oil for these particles throughout the life of the engine. By regularly inspecting the materials trapped by the screen, the user may detect unusual engine wear at an early stage and thereby be able to prevent a major engine failure.

BRIEF DESCRIPTION OF THE DRAWINGS

FIG. 1 is front view of an engine showing an exploded view in the area of the oil filter wherein a screen in accordance with the invention is visible.

FIG. 2 is a front view of an oil filter.

FIG. 3 is a front view of an oil filter that includes a screen in accordance with the invention overlying the filter's inlet ports FIG. 4 is a cross-sectional side view of the front portion of an oil filter attached to an engine and including a screen in accordance with the invention.

FIG. 5 is a front view of a screen in accordance with the invention.

FIG. 6 is a cross-sectional side view of the screen shown in FIG. 5 with the screen's thickness exaggerated for clarity.

DETAILED DESCRIPTION OF THE DRAWINGS

Referring now to the drawings in greater detail, wherein like reference characters refer to like parts throughout the several figures, there is shown by the numeral 1 a screen in accordance with the invention.

FIG. 1 shows a typical automobile engine 2 having an oil filter mounting base 4. Located at the center of the base is an outwardly extending nipple 6 that has exterior threads 8. The base has a ring-shaped front face 10 that is sized to contact a complementary annular gasket 12 in the oil filter 14. Located adjacent to and within the circle formed by the face 10 of the base is at least one oil port 16 that is connected to the engine's oil pump 17. The center of nipple 6 includes a through passage 18 through which oil can pass.

The oil filter 14 is of the standard type used on automobile engines and is cylindrical in shape and includes an interior filter material 20. At the front end 22 of the filter is located the gasket 12 within a groove 24. Spaced inwardly and rearwardly of the gasket are a plurality of inlet ports 26.

When the engine is operating, the oil pump sends the oil to the filter via port 16 in the filter mounting base. The oil then travels through the filter inlet ports 26 into the interior of the filter. The oil then encounters the filter material 20 and the particulate impurities of the oil become trapped in the material. The oil then continues through the material until it enters a center tube 28 of the filter via a plurality of orifices 30 in the tube's exterior. The oil then travels through the tube and enters passage 18 of the mounting base nipple 6. The oil continues through the passage and on to the bearing and other critical surfaces of the engine that require lubrication.

To enable a removable mounting of the oil filter to the filter base, the front end of tube 28 has interior threads 32 that are designed to engage the exterior threads 8 of the nipple. When the oil filter is installed, clockwise rotation of the filter causes it to move downwardly on the nipple until gasket 12 becomes compressed against the outer face 10 of the base. In this manner, a leak-free seal is created between the filter and the base.

FIGS. 3 and 4 show the oil filter after a screen 1 in accordance with the invention has been placed on the front end of the filter. The screen is generally planar and disk-like in shape and is slightly bowed to fit snugly against the slightly convex front face of the oil filter. A flat screen would be used with an oil filter that has a flat front face.

The screen is predominantly composed of a fine wire mesh 34 that has approximately 1600 openings per square inch (i.e.—a 40×40 mesh) Other slightly coarser or finer meshes may be used depending on the size of the particles that one wishes to trap and also on the type and age of the oil. For normal automotive uses, the 40×40 mesh is preferred.

The screen has a center aperture 36 that has an inner diameter slightly larger than the inner diameter of tube 28. A ring-shaped deposit 38 of solder is located in the mesh immediately adjacent the aperture to reinforce the mesh. For a typical oil filter having a front opening of tube 28 measuring 0.75 inches in diameter, the screen's center aperture 36 will be approximately 0.90 inches in diameter.

The outer edge of the screen is also reinforced. A ring-shaped metal covering 40 is wrapped about the outer edge of the mesh and functions to maintain the screen's disk-like shape. The outer diameter of the screen is slightly less than the inner diameter of the filter gasket 12. For example, if the oil filter gasket has an inner diameter of 3.2 inches, the outer diameter of the screen will be approximately 2.8 inches. In this manner, when a user places the screen on the front end of the oil filter, the screen is concentric with the oil filter and fits just within the area or recess bounded by the filter's mounting gasket.

Once the screen is in place on an oil filter, the screen's mesh overlies the filter's inlet ports 26 and is capable of trapping fine metallic and non-metallic particles before they reach the inlet ports of the oil filter. However, extremely fine dirt and other impurities that are common in used oil will be able to pass through the screen and become lodged within the oil filter. In this manner, the screen cannot be easily clogged and traps only the larger particles that would indicate unusual wear or damage.

It should be noted that use of the screen is not limited to automotive applications. The screen can be added to any engine having a standard-type removable filter as previously described.

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. An oil filter and pre-filter comprising:
   a cannister-type oil filter of the type commonly used for filtering the lubricating oil of an internal combustion engine, said oil filter having an outer housing that surrounds a filter material, said oil filter being cylindrical in shape and having a first end, a second end and a longitudinal axis that extends between said first and second ends, said first end including an annular gasket located proximate the periphery of said first end, said first end also including a plurality of spaced oil inlet ports located inwardly of said gasket, said first end further including a center bore having interior threads; and
   a pre-filter placed onto an exterior surface of the first end of the oil filter, said pre-filter being in the form of a generally planar screen having an outer diameter less than an inner diameter of the gasket of said oil filter, said screen having a center aperture that has a diameter that is equal to or greater than the diameter of the bore in the first end of the oil filter and wherein the screen has a top surface and a bottom surface and a plurality of apertures that extend continuously through and between said top and bottom surfaces and wherein the bottom surface of the pre-filter is placed onto the first end of the oil filter in a concentric manner, the top and bottom surfaces of the screen are substantially perpendicular to the longitudinal axis of the oil filter and a plurality of the screen's apertures overlie and are aligned with and adjacent to the oil filter's oil inlet ports.

2. The oil filter and pre-filter of claim 1 wherein the screen of the pre-filter has an approximately 40×40 mesh with approximately 1600 openings per square inch.

3. The oil filter and pre-filter of claim 1 wherein the screen of the pre-filter is made of stainless steel wire of approximately 24 gauge.

4. The oil filter and pre-filter of claim 1 wherein a first reinforcement means is located about the periphery of the center aperture of the screen of the pre-filter and a second reinforcement means is located about an outer edge of the screen of the pre-filter.

5. The oil filter and pre-filter of claim 4 wherein the first reinforcement means is in the form of a quantity of solder that has been melted into the screen in an area proximate the screen's center aperture.

6. An oil filter and pre-filter consisting of:
   a cannister-type oil filter of the type commonly used for filtering the lubricating oil of an internal combustion engine, said oil filter having an outer housing that surrounds a filter material, said oil filter being cylindrical in shape and having a first end, a second end and a longitudinal axis that extends between said first and second ends, said first end including an annular gasket located proximate the periphery of said first end, said gasket forming a recess with said first end, said first end also including a plurality of spaced oil inlet ports located inwardly of said gasket, said first end further including a center bore having interior threads; and
   a pre-filter placed onto the first end of the oil filter, said pre-filter being in the form of a generally planar screen of wire mesh material having an outer diameter less than an inner diameter of the gasket of said oil filter, said screen having a center aperture that has a diameter that is equal to or greater than the diameter of the bore in the first end of the oil filter and wherein the screen has a top surface and a bottom surface and a plurality of apertures that extend continuously through and between said top and bottom surfaces and where the pre-filter is placed onto the first end of the oil filter in a concentric manner, the bottom surface of the pre-filter is coaxially surrounded by the gasket and the outer housing of the oil filter and is located substantially within said recess with the top and bottom surfaces of the screen substantially perpendicular to the longitudinal axis of the filter so that a plurality of the screen's apertures overlie and are aligned with and adjacent to the oil filter's oil inlet ports.

* * * * *